US005848176A

United States Patent [19]

Hara et al.

[11] Patent Number: 5,848,176

[45] Date of Patent: Dec. 8, 1998

[54] FINGERPRINT FINGERTIP ORIENTATION DETECTION METHOD AND DEVICE

[75] Inventors: Masanori Hara; Kan Sato, both of Tokyo, Japan

[73] Assignee: NEC Corporation, Tokyo, Japan

[21] Appl. No.: 628,242

[22] Filed: Apr. 4, 1996

[30] Foreign Application Priority Data

Apr. 4, 1995 [JP] Japan .................................... 7-079033

[51] Int. Cl.[6] ........................................................ G06K 9/00

[52] U.S. Cl. ............................................ 382/124; 382/125

[58] Field of Search .................................... 382/124–126, 382/115; 356/71

[56] References Cited

U.S. PATENT DOCUMENTS

| | | | |
|---|---|---|---|
| 4,135,147 | 1/1979 | Riganati et al. | 382/125 |
| 4,310,827 | 1/1982 | Asai | 340/146.3 |
| 4,747,147 | 5/1988 | Sparrow | 382/125 |
| 5,497,429 | 3/1996 | Shibuya | 382/125 |
| 5,524,161 | 6/1996 | Omori et al. | 382/12 |
| 5,608,811 | 3/1997 | Kamei | 382/124 |
| 5,668,453 | 9/1997 | Muto et al. | 395/97 |

FOREIGN PATENT DOCUMENTS

| | | |
|---|---|---|
| 59-27945 | 7/1984 | Japan . |
| 63-13226 | 3/1988 | Japan . |
| 1-271883 | 10/1989 | Japan . |
| 1-271884 | 10/1989 | Japan . |

OTHER PUBLICATIONS

Gaffney, Jr., “Pattern Orientation Scheme”, IBM Technical Disclosure Bulletin, vol. 9, No. 6, (1966), p. 633.

Shelman et al., “Fingerprint Research at Argonne National Laboratory”, Proc. 1973 Carnahan Conf. On Electronic Crime Countermeasusures, 25 Apr. 1973, pp. 108–113.

Sparrow, “Topological Coordinate Systems: Application in Latent Mark Matching and Image Retrival”, 1986 Int. Conf. Carnahan on Security Technology, 12 Aug. 1986, pp. 235–243.

*Primary Examiner*—Leo H. Boudreau
*Assistant Examiner*—Bhavesh Mehta
*Attorney, Agent, or Firm*—Foley & Lardner

[57] ABSTRACT

The present invention has the object of accurately detecting fingerprint fingertip orientation by a process of calculating inner products of ridge directions in the peripheral areas of an inputted fingerprint and radial line directions, finding an inner product sequence in which the inner products are sequenced upon making one revolution from a certain initial point, finding sequence errors between the inner product sequence and a plurality of inner product sequence patterns of differing fingertip orientations for a standard fingerprint, and establishing the fingertip orientation of the inputted fingerprint as the fingertip orientation of the standard fingerprint having the minimum sequence error.

10 Claims, 6 Drawing Sheets

FIG. 4

FINGERPRINT FINGERTIP ORIENTATION DETECTION METHOD AND DEVICE

BACKGROUND OF THE INVENTION

1. Field of the Invention

The present invention relates to a fingerprint fingertip orientation detection device, and particularly to a fingerprint fingertip orientation detection device in a collating system employing fingerprints that detects and determines the orientation of standard coordinate axes required when representing each point in a fingerprint image by coordinates.

2. Description of the Related Art

Among streaked patterns composed of curved lines the many ridges making up a fingerprint generally do not change throughout an individual's lifetime, and moreover, are unique to each individual, and consequently have long been employed for personal identification.

Recent years have seen the development of systems capable of automatic fingerprint matching processing using pattern recognition technology employing computers. In these systems, fingerprint matching is achieved automatically by extracting and matching the minutiae interspersed throughout a fingerprint which include for example, the end points of ridges and bifurcations at which ridges split or run together. Japanese Patent Laid-open patent publication No. 13226/88 and U.S. Pat. No. 4,310,827 disclose examples of automatic fingerprint matching systems of the prior art.

When collating in a fingerprint matching system, the standard coordinate axes representing minutiae must be found. If coordinate axes not present in the fingerprint are used as the coordinate axes (for example, coordinates in which the image center is taken as center, the horizontal direction of a scan line is taken as the X-axis, and the vertical direction is taken as the Y-axis), matching a file fingerprint with a searched fingerprint generated from the same finger is considerably complicated due to significant positioning errors of minutiae as well as error in the directions of minutiae. The determination of highly reliable standard coordinate axes is of utmost importance in improving collation accuracy and shortening collation time.

One well-known method of determining the orientation of standard coordinate axes in fingerprint matching involves using the direction of ridges in the central portion of a fingerprint as the orientation of standard coordinate axes. This method uses the direction of ridges in the central vicinity and is therefore known as a "central ridge orientation method." A method of extracting the ridge direction is disclosed in Japanese Patent Laid-open patent publication No. 27945/84.

As another method of determining the orientation of standard coordinate axes, a simple method can be considered in which the perpendicular direction of the scan surface is used as the orientation of the standard coordinate axes. This method takes advantage of the normal orientation of fingerprints with the direction of the fingertip aligned with the vertical direction of the scan surface and is consequently known as the "vertical axis method."

Of the prior art, the central ridge orientation method has the drawback that unclearness of ridges in the central area prevents extraction of a ridge direction.

A further drawback exists in that ridge direction in the central portion cannot be inferred from partial or latent fingerprints in which the central portion is missing.

Furthermore, central ridge direction is difficult to determine in fingerprints having an unstable ridge configuration in the central portion.

FIG. 1 (*a*) shows one example of a fingerprint in which the above -described problems are a factor. Here, determination is complicated because any direction between direction 61 and direction 62 could be taken as the orientation of the central ridges. Moreover, a mistake in centering the fingerprint can result in a significant shift in direction. For example, in the fingerprint shown in FIG. 1 (*b*), either of directions 64 and 65 could be taken as the central ridge direction depending on the position taken as center.

In the vertical axis method, on the other hand, collation fails if the fingerprint is taken with the fingertip in a non-vertical position. Methods exist in which an operator manually inputs the correct fingertip orientation for fingerprints that have been taken with the fingertip not vertical, but such methods entail extra costs for input by an operator.

SUMMARY OF THE INVENTION

The object of the present invention is to provide a fingerprint fingertip orientation detection method that accurately detects the fingertip orientation of a fingerprint.

The fingerprint fingertip orientation detection method of the present invention is characterized by:

calculating the inner products of ridge directions and radial line directions around the circumference of an inputted fingerprint, finding an inner product sequence in which the inner products are sequenced upon completing one revolution from a certain initial point, and finding sequence errors between this inner product sequence and each of plurality of inner product sequence patterns each having differing fingertip orientations for a standard fingerprint; and taking as the fingertip orientation of the inputted fingerprint the fingertip orientation of the standard fingerprint for which the sequence error is a minimum.

A modification of the fingerprint fingertip orientation detection method of the present invention is characterized by:

calculating the inner product of ridge directions and radial line directions around the circumference of an inputted fingerprint, finding an inner product sequence in which the inner products are sequenced upon making one revolution from a certain initial point, and finding cross-correlation between this inner product sequence and each of a plurality of inner product sequence patterns having differing fingertip orientations for a standard fingerprint; and taking as the fingertip orientation of the inputted fingerprint the fingertip orientation of a standard fingerprint for which the cross-correlation is a maximum.

Yet another modification of the fingerprint fingertip orientation detection method of the present invention is characterized by:

finding ridge directions at prescribed positions around the circumference of an inputted fingerprint, finding a ridge direction sequence in which the ridge directions are sequenced upon making one revolution from a certain initial point, and finding an error sequence between the ridge direction sequence and each of a plurality of ridge direction sequence patterns for differing fingertip orientations for a standard fingerprint; and taking as the fingertip orientation of the inputted fingerprint the fingertip orientation of a standard fingerprint when the sequence error is a minimum.

In any one of the above-described methods, a plurality of typical fingerprints having differing patterns may be used as standard fingerprints.

In this case, an averaged pattern of a plurality of fingerprints having the same pattern type may be used as a typical fingerprint.

A fingerprint fingertip orientation detection device according to the present invention is composed of:

a ridge direction storage section that registers fingerprint ridge directions existing in the picture elements of an inputted fingerprint image that has been quantized into picture elements of two-dimensional array form;

a fingerprint center coordinate storage section that registers center coordinates of an inputted fingerprint image;

an inner product sequence pattern dictionary that registers in advance inner product sequence patterns that are defined for a plurality of fingerprints serving as standards and fingertip orientations corresponding to these inner product sequence patterns;

an inner product sequence calculation section that calculates, from fingerprint ridge directions in the picture elements of an inputted fingerprint image stored in the ridge direction storage section and from center coordinates stored in the fingerprint center coordinate storage section, the inner products of radial line directions and ridge directions at coordinate values separated from the center coordinates by a fixed distance on radial lines, and finds an inner product sequence in which the results of one revolution from a particular initial point are sequenced;

an inner product sequence temporary storage section that registers inner product sequences found in the inner product sequence calculation section;

an inner product sequence error calculation section that finds a plurality of sequence errors for each of a plurality of fingerprints that serve as standards by finding sequence errors by comparing inner product sequences of inputted fingerprint images registered in the inner product sequence temporary storage section with a plurality of inner product sequence patterns of fingerprints that serve as standards registered in the inner product sequence pattern dictionary while varying fingertip orientation by rotating the inner product sequence patterns of fingerprints serving as standards;

a sequence error temporary storage section that registers each sequence error found using the inner product sequence error calculation section and the corresponding fingertip orientation;

an orientation detection section that outputs fingertip orientations corresponding to the sequence error having the minimum value among those registered in the sequence error temporary storage section; and a control section that controls the timing of each operation of the inner product sequence calculation section, inner product sequence error calculation section, and orientation detection section.

Another modification of the fingerprint fingertip orientation detection device of the present invention is composed of:

a ridge direction storage section that registers fingerprint ridge directions existing in the picture elements of an inputted fingerprint image that has been quantized into picture elements of two-dimensional array form;

a fingerprint center coordinate storage section that registers center coordinates of an inputted fingerprint image;

an inner product sequence pattern dictionary that registers in advance inner product sequence patterns that are defined for a plurality of fingerprints serving as standards and fingertip orientations corresponding to these inner product sequence patterns;

an inner product sequence calculation section that calculates, from fingerprint ridge directions in the picture elements of an inputted fingerprint image stored in the ridge direction storage section and from center coordinates stored in the fingerprint center coordinate storage section, the inner products of radial line directions and ridge directions at coordinate values separated from the center coordinates by a fixed distance on radial lines, and finds an inner product sequence in which the results of one revolution from a particular initial point are sequenced;

an inner product sequence temporary storage section that registers inner product sequences found in the inner product sequence calculation section;

an inner product sequence error calculation section that finds a plurality of cross-correlations for each of a plurality of fingerprints that serve as standards by finding cross-correlations by comparing inner product sequences of inputted fingerprint images registered in the inner product sequence temporary storage section with inner product sequence patterns of a plurality of fingerprints that serve as standards registered in the inner product sequence pattern dictionary while varying fingertip orientation by rotating the inner product sequence patterns of fingerprints serving as standards;

a sequence error temporary storage section that registers each cross-correlation found using the inner product sequence error calculation section and the corresponding fingertip orientation;

an orientation detection section that outputs a fingertip orientation corresponding to the cross-correlation having the maximum value among those registered in the sequence error temporary storage section; and a control section that controls the timing of each operation of the inner product sequence calculation section, inner product sequence error calculation section, and orientation detection section.

Another modification of the fingertip orientation detection device of the present invention is composed of:

a ridge direction storage section that registers fingerprint ridge directions existing in the picture elements of an inputted fingerprint image that has been quantized into picture elements of two-dimensional array form;

a fingerprint center coordinate storage section that registers center coordinates of an inputted fingerprint image;

a ridge direction sequence pattern dictionary that registers in advance ridge direction sequence patterns defining sequences of ridge directions that are aligned circumferentially around the circumference of a plurality of fingerprints serving as standards and fingertip orientations corresponding to these ridge direction sequence patterns;

a ridge direction sequence calculation section that calculates, from fingerprint ridge directions in the picture elements of an inputted fingerprint image stored in the ridge direction storage section and from center coordinates stored in the fingerprint center coordinate storage section, the ridge directions relative to radial line directions and ridge directions at coordinate values separated from the center coordinates by a fixed distance on radial lines, and finds a ridge direction sequence in which the results of one revolution from a particular initial point are sequenced;

a ridge direction sequence temporary storage section that registers ridge direction sequences found in the ridge direction sequence calculation section;

a ridge direction sequence error calculation section that finds a plurality of sequence errors for each of a plurality of fingerprints that serve as standards by comparing ridge direction sequences of inputted fingerprint images registered in the ridge direction sequence temporary storage section with ridge direction sequence patterns of a plurality of fingerprints that serve as standards registered in the ridge direction sequence pattern dictionary and finding sequence errors from differences between these directions while varying fingertip orientation by rotating the ridge direction sequence patterns of fingerprints serving as standards;

a sequence error temporary storage section that registers each sequence error found using the ridge direction sequence error calculation section and the corresponding fingertip orientation;

an orientation detection section that outputs fingertip orientation corresponding to the sequence error having the minimum value among those registered in the sequence error temporary storage section; and a control section that controls the timing of each operation of the inner product sequence calculation section, ridge direction sequence error calculation section, and orientation detection section.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 4 shows an example of a digitized fingerprint image.

DETAILED DESCRIPTION OF THE PREFERRED EMBODIMENT

Figure 1A:
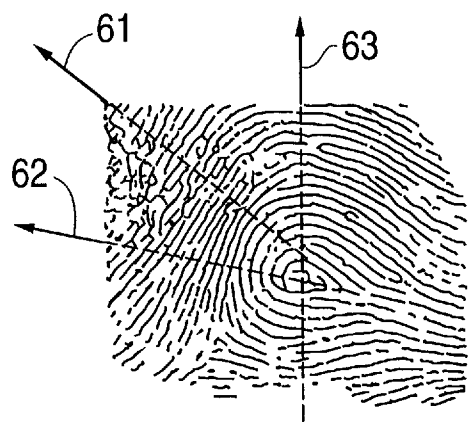
FIGS. 1(*a*) and 1(*b*) present examples of central ridge orientation and fingertip orientation.
Figure 1B:
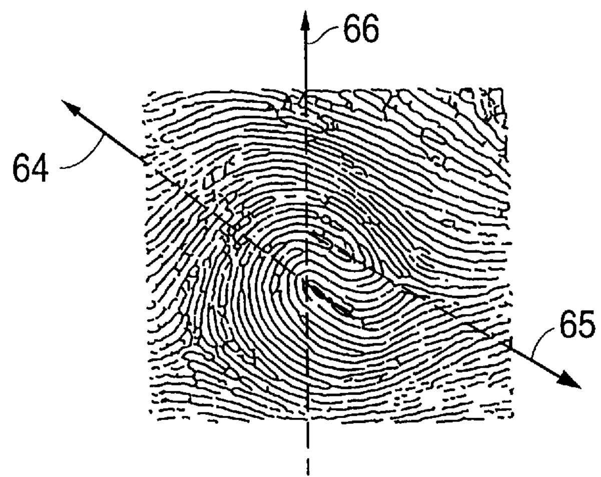
Figure 2A:
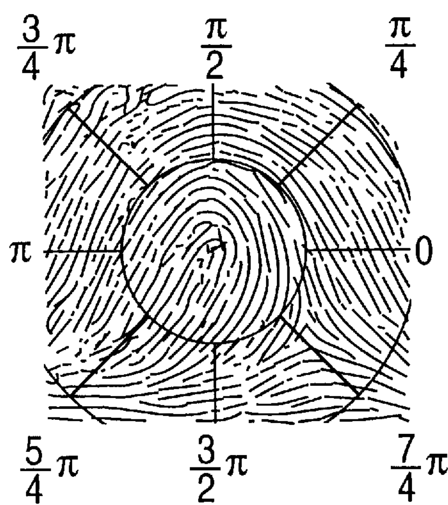
FIGS. 2(*a*)–2(*f*) illustrate the principles of the present invention.
Figure 2D:
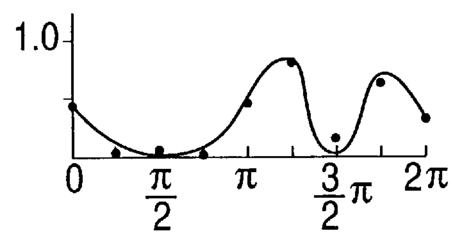
Figure 2B:
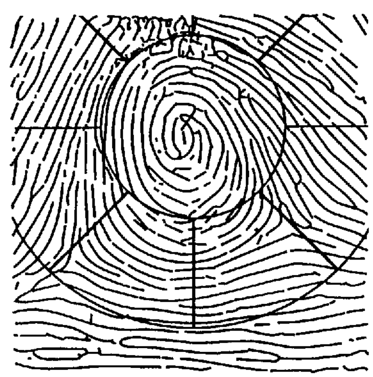
Figure 2E:
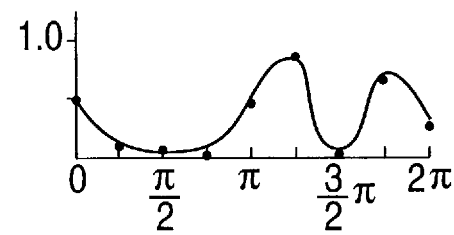
Figure 2C:
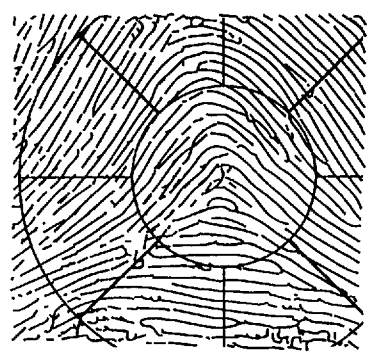
Figure 2F:
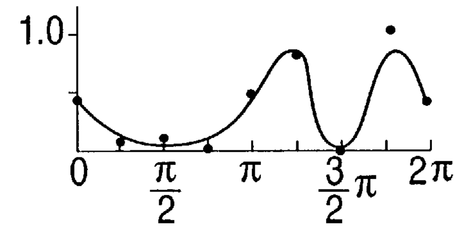
Figure 3:
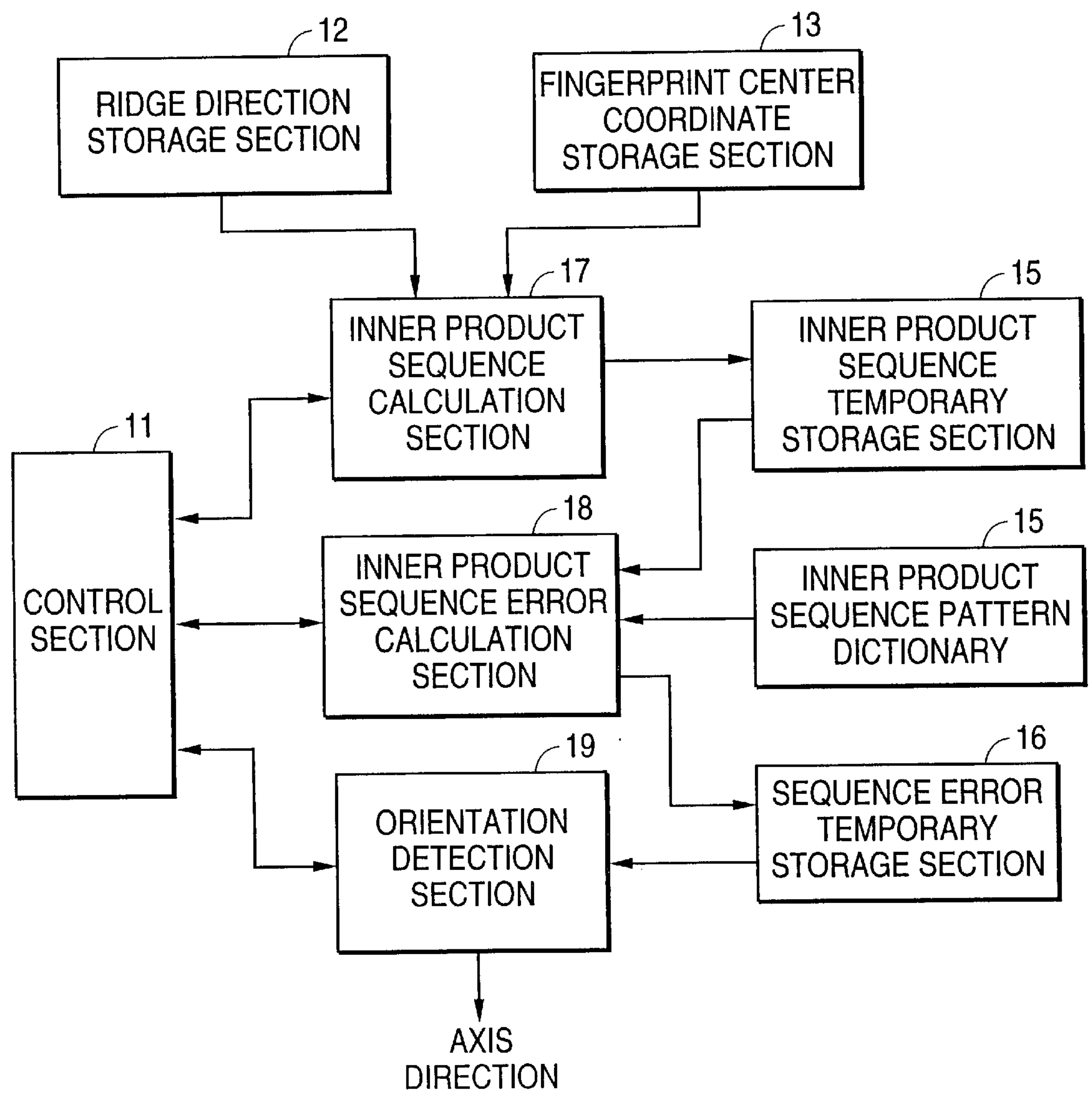
FIG. 3 is a block diagram showing the construction of the first embodiment of the present invention.
Figure 4:
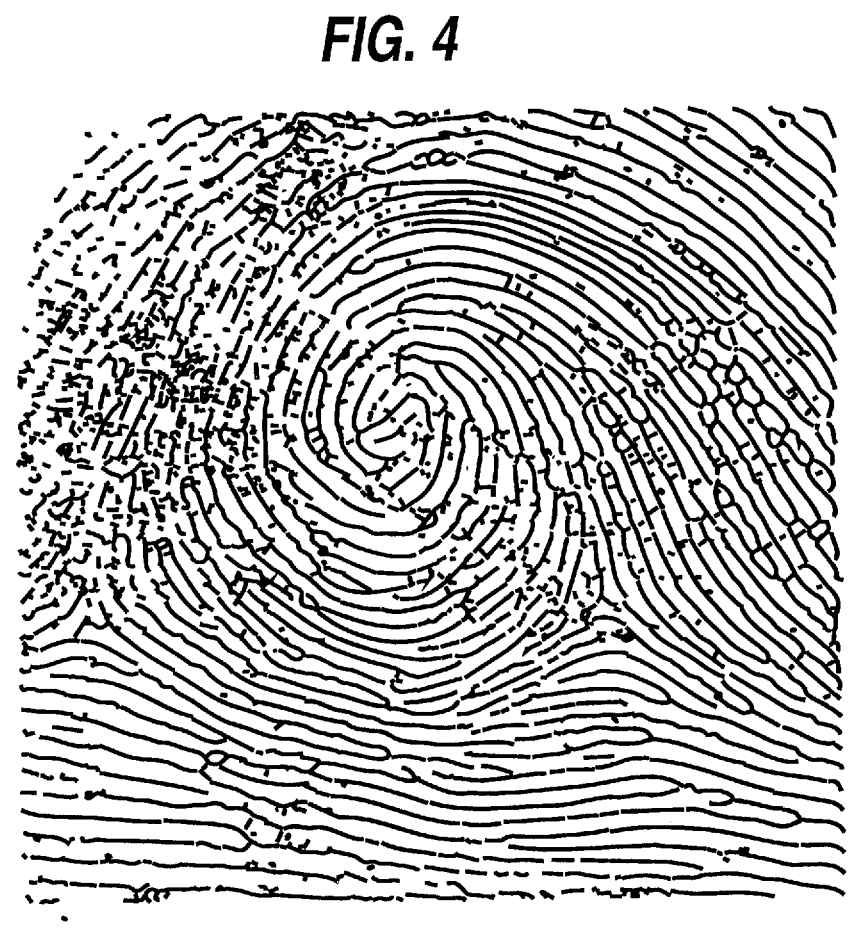
Figure 5A:
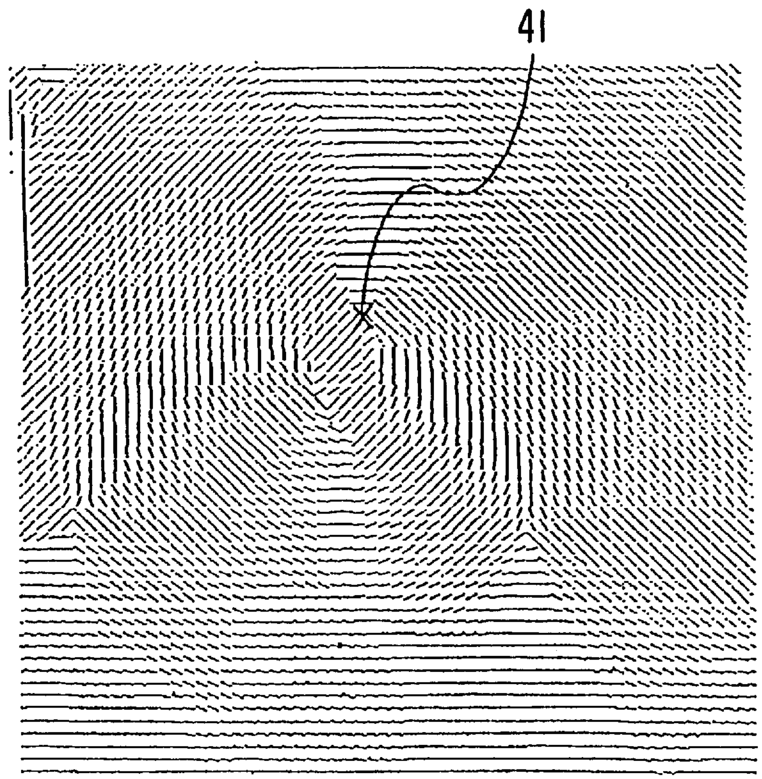
FIGS. 5(*a*) and 5(*b*) show ridge directions.
Figure 5B:
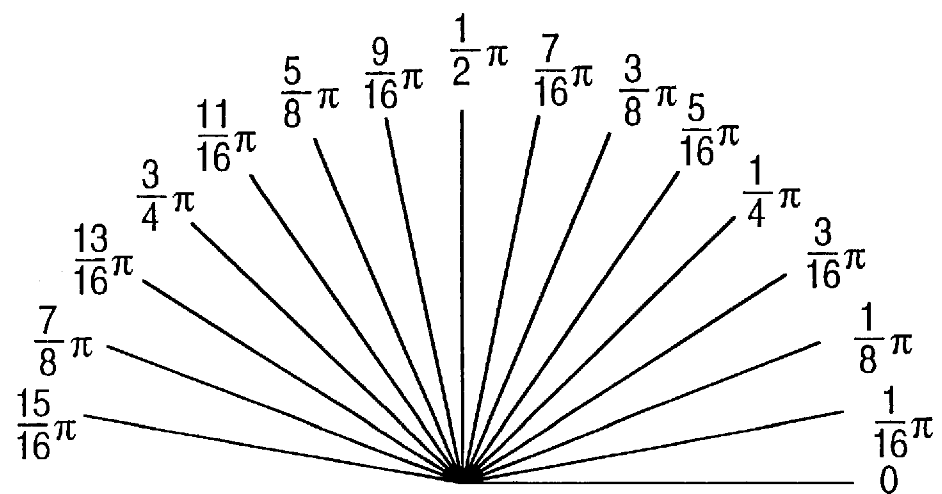

Embodiments of the present invention will next be explained with reference to the accompanying drawings. FIGS. 2(*a*)–2(*f*) illustrate the principles of the present invention, and FIG. 3 is a block diagram showing the construction of one embodiment of the present invention. FIG. 4, FIGS. 5(*a*) and 5(*b*), and FIGS. 6(*a*) and 6(*b*) are for the purpose of explaining this embodiment.

The principles of the present invention will first be explained with reference to FIG. 2 (*a*) and FIG. 2 (*d*). The fingerprint image of FIG. 2 (*a*) has been taken with the fingertip oriented exactly vertical. A radial line is drawn in a right horizontal direction from the fingerprint center. Radials are similarly drawn at intervals of $\pi/4$ in a counter-clockwise direction. Focusing on angular differences between radial directions and ridge directions at points somewhat separated from the center, it can be seen that angular differences are large above and below the center ($\pi/2$ and $3\pi/2$), while angular difference are small to the lower left and lower right of the center ($5\pi/4$ and $7\pi/4$). The present embodiment is intended to simplify processing by representing the angular difference between two directions with the absolute value of the inner product of a unit vector having two directions.

The inner product of this embodiment is defined as the absolute value of the inner product of a unit vector having two directions. FIG. 2 (*d*) is a graph in which the horizontal axis gives the angle as measured in a counter-clockwise direction from the right horizontal direction, and the vertical axis gives the inner product of the radial line direction and ridge direction for each angle.

The results of graphing different fingerprints as described above are graphs of the same configuration as shown in FIG. 2 (*d*). FIGS. 2 (*e*) and 2 (*f*) present the results of graphing the whorl fingerprint and arch fingerprint shown in FIGS. 2 (*b*) and 2 (*c*), respectively, and both graphs have substantially the same form as FIG. 2 (*d*).

From this it can be seen that angular differences (and inner products) between ridge lines around the circumference of a fingerprint and radial lines from the center correlate with fingertip orientation. If a dictionary of inner product distribution patterns is produced using fingerprints of known fingertip orientation, the fingertip orientation of an unknown fingerprint can be detected by calculating the inner product and comparing it with patterns in the dictionary.

The construction of a fingerprint fingertip orientation detection device according to the present embodiment will next be explained with reference to FIG. 3, which is a block diagram showing such a device.

A fingerprint fingertip orientation detection device of this embodiment is made up of ridge direction storage section 12, fingerprint center coordinate storage section 13, inner product sequence temporary storage section 14, inner product sequence pattern dictionary 15, sequence error temporary storage section 16, inner product sequence calculation section 17, inner product sequence error calculation section 18, orientation detection section 19, and control section 11.

Fingerprint ridge directions in picture elements of an inputted fingerprint image that has been quantized to picture elements in two-dimensional array form are registered to ridge direction storage section 12.

The center coordinates of an inputted fingerprint image are registered in fingerprint center coordinate storage section 13.

Inner product sequence patterns that are defined for a plurality of fingerprints that serve as standards and corresponding fingertip orientations are registered in advance to inner product sequence pattern dictionary 15.

Based on fingerprint ridge directions of picture elements of an inputted fingerprint image stored in the ridge direction storage section 12 and center coordinates stored in the fingerprint center coordinate storage section 13, inner product sequence calculation section 17 calculates the inner products of radial line directions and ridge directions at coordinate values at a fixed distance from the center coordinates on radial lines, and finds the inner product sequence which is the result of one revolution from a certain initial point made into a sequence.

The inner product sequence found in inner product sequence calculation section 17 is registered to inner product sequence temporary storage section 14.

Inner product sequence error calculation section 18 compares the inner product sequence of an input fingerprint image registered in the inner product sequence temporary storage section 14 with inner product sequence patterns of the plurality of fingerprints that serve as standards registered in inner product sequence pattern dictionary 15, finds sequence errors while varying fingertip orientation by rotating inner product sequence patterns of fingerprints serving as standards, and finds a plurality of sequence errors for each of the plurality of fingerprints serving as standards.

Each of the sequence errors and corresponding fingertip orientations found by inner product sequence error calculation section 18 are registered to sequence error temporary storage section 16.

Orientation detection section 19 outputs the fingertip orientation that corresponds to the minimum value among the sequence errors registered in the sequence error temporary storage section 16.

Control section 11 controls the timing of each operation of the inner product sequence calculation section 17, inner product sequence error calculation section, and orientation detection section.

The operation of the present embodiment will next be explained with reference to FIGS. 2(*a*) to 6. In the prior art, fingerprint ridge directions are automatically extracted as described in, for example, Japanese Patent Laid-open patent publication No. 27945/84. Essentially, the small fluctuation in density in the same direction as a streak and the large fluctuation in a direction orthogonal to a streak in the short direction of a picture element having a streaked pattern picture image are used to find extreme values of fluctuation in density along a plurality of predetermined quantized directions, and the directions of streaks are determined from these extreme values. FIG. 4 shows an example of a fingerprint image scanned at a resolution of 20 picture elements per millimeter, with an area of 25.6 mm square being two-dimensionally digitized as 512 picture elements square. FIG. 5 (*a*) shows the results of directionally extracting this picture image using a method disclosed in Japanese Patent Laid-open patent publication No. 27945/84. FIG. 5 (*a*) shows ridge directions in terms of the 16 types, of directions shown in FIG. 5 (*b*) for each area 8 picture elements square.

In addition, the fingerprint center can also be automatically extracted using a prior art method disclosed in, for example, Japanese Patent Applications No. 99334/88 and No. 99335/88.

The technique disclosed in Japanese Patent Application No. 99334/88 is a method of determining the center of a fingerprint in which ridge direction curvature patterns and near center point existence probabilities are established as a dictionary by finding in advance the correlation between patterns of direction and curvature of fingerprint ridges in each region and the center of a fingerprint. When an unknown fingerprint is inputted, the center existence probability dictionary is searched using ridge direction curvature patterns of each area, and the center existence probability in the area vicinity is updated. When the updating process of existence probabilities has been completed for all areas, the area having largest existence probability is detected as the center.

The technique disclosed in Japanese Patent Application No. 99335/88 is a method of determining the location of the vertical axis of the center (Y coordinate). In this method, using a typical fingerprint, the curvature of ridges is examined by scanning the fingerprint ridges in a horizontal direction, and the maximum upward curvature is found. The maximum curvature found in horizontal scanning is next found in a vertical direction from up to down, a sequence of maximum curvature is set as a curvature curve pattern, and this pattern is established as a dictionary together with the center Y coordinate of that fingerprint. When an unknown fingerprint is inputted, curvature curves are found in the same manner, compared with curvature curve patterns in the dictionary, and the center Y coordinate corresponding to the curvature curve pattern having the smallest error is detected as the center Y coordinate of the inputted fingerprint.

Fingerprint center 41 of FIG. 5 (*a*) is an example extracted from the fingerprint image of FIG. 4 using the methods disclosed in Japanese Patent Application No. 99334/88 and Japanese Patent Application No. 99335/88.

The ridge directions within each picture element or small area unit of an inputted fingerprint image are registered in advance to ridge direction storage section 12, and the center coordinate of an inputted fingerprint is registered in advance to fingerprint center coordinate storage section 13. Inner product sequences and the corresponding fingertip orientations for the typical fingerprints shown in FIGS. 2 (*a*), 2 (*b*), and 2 (*c*) are registered in advance to inner product sequence pattern dictionary 15.

Furthermore, when extracting typical inner product sequence patterns, various fingerprints such as the typical fingerprint shown in FIG. 2 (*a*) are selected, the inner product sequences for these fingerprints calculated, and the results graphed as shown in FIG. 2 (*d*). Here, a sequence using discrete values or a curvilinear function in which a sequence of discrete values approximates a curve may be used. When using a sequence of discrete values, angle units must match the angle units necessary as axial directions of the standard coordinate axes.

The present embodiment employs angle units of $\pi/32$ (angles in which one revolution $2\pi$ has been divided into 64 portions). The fingerprint shown in FIG. 2 (*a*) was taken with fingertip orientation exactly vertical, and consequently, the fingertip orientation corresponding to the inner product pattern of FIG. 2 (*d*) is $\pi/2$.

The fingerprint of FIG. 2 (*a*) is a typical loop pattern, but greater accuracy can be achieved for other typical patterns including the whorl pattern shown in FIG. 2 (*b*) or the arch pattern shown in FIG. 2 (*c*) by graphing the inner products as shown in FIG. 2 (*e*) and FIG. 2 (*f*) by the same method and extracting the inner patterns.

Based on formula (1) below, inner product sequence calculation section 17 calculates the coordinates of positions on a radial line in the direction ($n\cdot\pi/32$) as measured in a counter-clockwise direction from the X axis and at a fixed distance r from the center coordinates (x0 y0) inputted from fingerprint center coordinate storage section 13:

$$x(n)=x0+r\cdot\cos(n\cdot\pi/32)$$

$$y(n)=y0+r\cdot\sin(n\cdot\pi/32)$$

$$n=0, 1, 2, \ldots, 63 \quad (1)$$

Figure 6A:
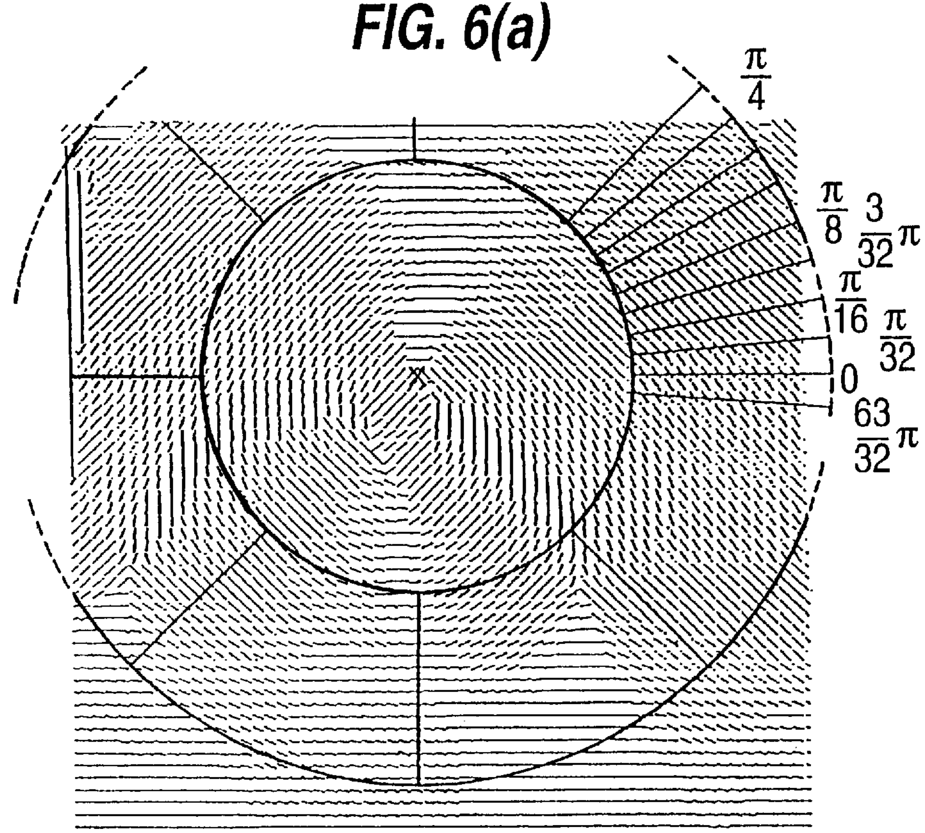
FIGS. 6(*a*) and 6(*b*) illustrate an inner product sequence.
Figure 6B:
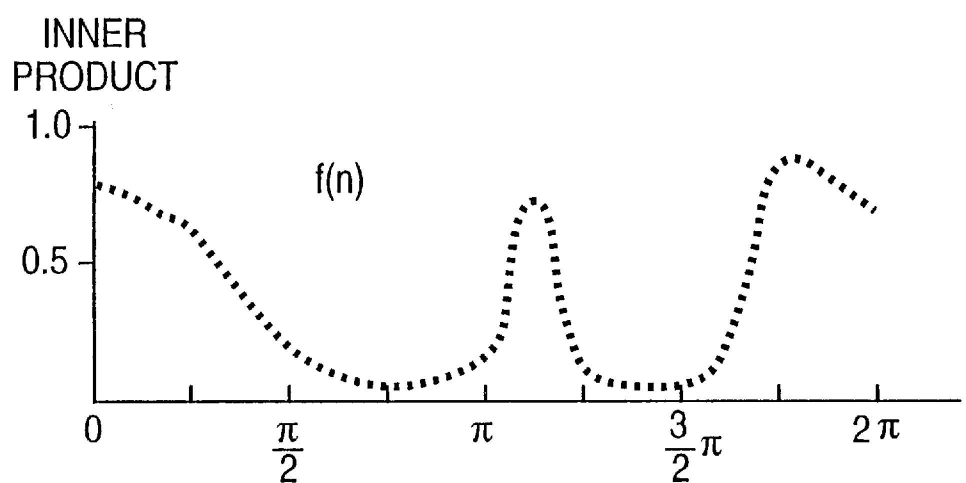

Variable n ranges from 0 to 63 and corresponds to a ray in the right horizontal direction of FIG. 6 (*a*) when n=0, corresponds to a ray in the $\pi/32$ direction of FIG. 6 (*a*) when n=1, and proceeds similarly for values of n=2 and beyond.

Inner product sequence calculation section 17 next gets the ridge direction corresponding to coordinates (x (n), y (n)) from ridge direction storage section 12. If this ridge direction is d (x (n), y (n)), the inner product on the ray of direction ($n\cdot\pi/32$) can be calculated using the formula (2) shown below:

$$f(n)=|\cos(d(x(n), y(n))-n\cdot\pi/32)| \quad (2)$$

Ridge directions around the fingerprint circumference where ridge directions have stabilized are taken as the object, and accordingly, a distance of from 100 picture elements (5 mm) to 200 picture elements (10 mm) is preferably employed as the value of fixed distance r. Greater accuracy can be obtained by sampling at an appropriate number of points (for example, 5 points) within this distance, calculating the inner products f (n) for each and averaging the results.

The inner product f (n) for FIG. 6 (*a*) is represented by the discrete-value graph shown in FIG. 6 (*b*). Inner product sequence calculation section 17 registers inner products f (n) calculated in this way to inner product sequence temporary storage section 14 as the sequence {n=0, 1, . . . 63}.

Inner product sequence error calculation section 18 compares the inner product sequences f (n) ; {n=0, 1, . . . , 63} with one inner product sequence pattern t (i) ; {i=0, 1, . . . , 63} registered in inner product sequence pattern dictionary 15 and calculates sequence errors. If, for example, the method of least squares is employed, error e can be calculated as shown by the following formula (3):

$$e(m) = \sum_{n=0}^{63} (f(n) - t(i))^2 \qquad (3)$$

$$i = mod(n - m, 64)$$

$$m = 0,1,2, \ldots ,63$$

where variable m is used to represent the inner product sequence pattern corresponding to an image rotated (m·π/32) in a counter-clockwise direction. The fingertip orientation corresponding to an inner product sequence pattern at this time is a value in which (m·π/32) has been added to the original fingertip orientation.

Inner product sequence error calculation section 18 registers sequence error e (m) and the corresponding fingertip orientation for each m to sequence error temporary storage section 16. This process is repeated for all inner product sequence patterns registered in inner product sequence pattern dictionary 15.

Orientation detection section 19 searches the sequence errors registered in sequence error temporary storage section 16 for the minimum sequence error and outputs the fingertip orientation corresponding to this sequence error as the detected fingertip orientation.

The present invention is not limited to the above-described embodiment and may, for example, be constructed as shown in cases 1 to 3 described hereinbelow.

(1) In the above-described embodiment, sequence errors were found using the method of least squares, but it is also possible to find cross-correlations between inner product sequence patterns and the inner product sequences of inputted data and detect the fingertip orientation corresponding to the sequence pattern giving the maximum value. In this case, t (n):{n=0, 1, 2, . . . 63}, which are normalized values found by subtracting the averaged value of all sequences from inner products f (n) registered in inner product sequence pattern dictionary 15 as shown in formula (4) below, are dictionary-registered as inner product sequence patterns.

$$t(n) = f(n) - \sum_{j=0}^{63} f(j)/64 \qquad (4)$$

$$n = 0,1,2, \ldots ,63$$

Next, the cross-correlation of dictionary patterns with respect to the inner products f (n) of an inputted fingerprint are calculated using the following formula (5):

$$c(m) = \sum_{n=0}^{63} f(n) \cdot t(i) \qquad (5)$$

$$i = mod(n - m, 64)$$

$$m = 0,1,2, \ldots ,63$$

Inner product sequence error calculation section 18 registers cross-correlation c (m) and the corresponding fingertip orientation for each m to sequence error temporary storage section 16. Orientation detection section 19 searches among cross-correlations registered in sequence error temporary storage section 16 for the maximum cross-correlation, and outputs the fingertip orientation corresponding to this cross-correlation as the detected fingertip orientation.

(2) In the above-described embodiment, the inner products between ridge directions around the circumference of a fingerprint and radial line directions from the fingerprint center are used as a characteristic for simplifying sequence error calculations, but the fingerprint-periphery ridge directions themselves can be employed as a characteristic. In this case, the inner products of the above-described embodiment can be replaced by ridge directions.

In concrete terms, the inner product sequence temporary storage section 14, the inner product sequence pattern dictionary 15, the inner product sequence calculation section 17, and the inner product sequence error calculation section 18 are each made a ridge direction sequence temporary storage section, a ridge direction sequence pattern dictionary, a ridge direction sequence calculation section, and a ridge direction sequence error calculation section, respectively.

Here, ridge direction sequence patterns in which ridge directions around the circumference of a fingerprint are aligned circumferentially are registered in the ridge direction sequence pattern dictionary.

As in the above-described embodiment, for center coordinates (x0, y0), coordinates (x (n), y (n)) of a position at a fixed distance r on a radial line in the direction (n·π/32) as measured in a counter-clockwise direction from the X-axis are calculated at ridge direction sequence calculation section. Next, the ridge direction corresponding to coordinate (X (n), y (n)) is taken from ridge direction storage section 12. This ridge direction d (x (n), y (n)) is registered to the ridge direction sequence temporary storage section as the sequence of ridge direction f (n); {n=0, 1, . . . , 63}.

The ridge direction sequence error calculation section compares inner product sequence f (n); {n=0, 1, . . . , 63} with one inner product sequence pattern registered in ridge direction sequence pattern dictionary t (i); {i=0, 1, . . . , 63} and calculates the sequence errors. The ridge direction sequence in this case is the sequence of ridge directions, and the following formula (6) can be considered as the function for evaluating the direction error between two directions D1 and D2:

$$1-|\cos(D1-D2)| \qquad (6)$$

Accordingly, error e of the sequence of ridge directions can be calculated by using, for example, the law of least squares as shown in formula (7) below:

$$e(m) = \sum_{n=0}^{63} (1 - |\cos(f(n) - t(i))|)^2 \qquad (7)$$

$$i = mod(n - m, 64)$$

$$m = 0,1,2, \ldots ,63$$

(3) In the above-described embodiments, a plurality of inner product pattern dictionaries are produced using typical fingerprints, but it is also possible to produce a pattern dictionary for every pattern type by finding inner product sequences for a large number of fingerprints of the same pattern type and then averaging. A method may also be considered in which one pattern dictionary is produced by averaging for fingerprints of different patterns types instead of producing a dictionary for every pattern type.

As explained hereinabove, the present invention enables reliable orientation detection for fingerprints lacking clear ridges in central regions or fingerprints in which the central ridge configuration is unstable by a process of calculating the inner products of circumferential ridge directions and radial line directions, producing a sequence by making one revolution from a certain initial point, comparing inner product sequences of standard fingerprints with the inner product sequence of an inputted fingerprint while varying the fingertip orientation, and thereby finding the fingertip orientation. As a result, the present invention obviates the processing steps of checking and correcting orientation by an operator and allows an improvement in collation accuracy.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A fingerprint fingertip orientation detection method comprising the steps of:

storing a plurality of inner product sequence patterns for differing fingertip orientations for a standard fingerprint;

calculating inner products of ridge directions and radial line directions around a circumference of an inputted fingerprint, finding an inner product sequence in which said inner products are sequenced upon completing one revolution from a certain initial point, and finding sequence errors between the inner product sequence and each of the stored plurality of inner product sequence patterns for differing fingertip orientations for a standard fingerprint; and taking as the fingerprint orientation of the inputted fingerprint the fingerprint orientation of a standard fingerprint for which said sequence error is a minimum.

2. A fingerprint fingertip orientation detection method according to claim 1 wherein a plurality of typical fingerprints having differing patterns are used as standard fingerprints.

3. A fingerprint fingertip orientation detection method according to claim 2 wherein a plurality of fingerprints of the same pattern type are averaged and used as a typical fingerprint.

4. A fingerprint fingertip orientation detection method comprising the steps of:

storing a plurality of inner product sequence patterns for differing fingertip orientations for a standard fingerprint;

calculating inner products of ridge directions and radial line directions around a circumference of an inputted fingerprint, finding an inner product sequence in which said inner products are sequenced upon making one revolution from a certain initial point, and finding cross-correlation between the inner product sequence and each of the stored plurality of inner product sequence patterns for differing fingertip orientations for a standard fingerprint; and taking as the fingerprint orientation of the inputted fingerprint the fingerprint orientation of a standard fingerprint for which said cross-correlation is a maximum.

5. A fingerprint fingertip orientation detection method according to claim 4 wherein a plurality of typical fingerprints having differing patterns are used as standard fingerprints.

6. A fingerprint fingertip orientation detection method according to claim 5 wherein a plurality of fingerprints of the same pattern type are averaged and used as a typical fingerprint.

7. A fingerprint fingertip orientation detection device comprising:

a ridge direction storage section that registers fingerprint ridge directions existing in picture elements of an inputted fingerprint image that has been quantized into picture elements of two-dimensional array form;

a fingerprint center coordinate storage section that registers center coordinates of an inputted fingerprint image;

an inner product sequence pattern dictionary that registers in advance inner product sequence patterns that are defined for a plurality of fingerprints serving as standards and fingertip orientations corresponding to these inner product sequence patterns;

an inner product sequence calculation section that calculates, from fingerprint ridge directions in picture elements of an inputted fingerprint image stored in said ridge direction storage section and from center coordinates stored in said fingerprint center coordinate storage section, inner products of radial line directions and ridge directions at coordinate values separated from the center coordinates by a fixed distance on radial lines, and finds an inner product sequence in which results of one revolution from a particular initial point are sequenced;

an inner product sequence temporary storage section that registers inner product sequences found in said inner product sequence calculation section;

an inner product sequence error calculation section that finds a plurality of sequence errors for each of a plurality of fingerprints that serve as standards by finding sequence errors by comparing inner product sequences of inputted fingerprint images registered in said inner product sequence temporary storage section with a plurality of inner product sequence patterns of fingerprints that serve as standards registered in said inner product sequence pattern dictionary while varying fingertip orientation by rotating the inner product sequence patterns of fingerprints serving as standards;

a sequence error temporary storage section that registers each sequence error found using said inner product sequence error calculation section and a corresponding fingertip orientation;

an orientation detection section that outputs fingertip orientations corresponding to a sequence error having a minimum value among those registered in said sequence error temporary storage section; and a control section that controls timing of each operation of said inner product sequence calculation section, inner product sequence error calculation section, and orientation detection section.

8. A fingerprint fingertip orientation detection device comprising:

a ridge direction storage section that registers fingerprint ridge directions existing in picture elements of an inputted fingerprint image that has been quantized into picture elements of two-dimensional array form;

a fingerprint center coordinate storage section that registers center coordinates of an inputted fingerprint image;

an inner product sequence pattern dictionary that registers in advance inner product sequence patterns that are defined for a plurality of fingerprints serving as standards and fingertip orientations corresponding to these inner product sequence patterns;

an inner product sequence calculation section that calculates, from fingerprint ridge directions in picture elements of an inputted fingerprint image stored in said ridge direction storage section and from center coordinates stored in said fingerprint center coordinate storage section, inner products of radial line directions and ridge directions at coordinate values separated from the center coordinates by a fixed distance on radial lines, and finds an inner product sequence in which results of one revolution from a particular initial point are sequenced;

an inner product sequence temporary storage section that registers inner product sequences found in said inner product sequence calculation section;

an inner product sequence error calculation section that finds a plurality of cross-correlations for each of a plurality of fingerprints that serve as standards by finding cross-correlations by comparing inner product sequences of inputted fingerprint images registered in said inner product sequence temporary storage section with inner product sequence patterns of a plurality of fingerprints that serve as standards registered in said inner product sequence pattern dictionary while varying fingertip orientation by rotating the inner product sequence patterns of fingerprints serving as standards;

a sequence error temporary storage section that registers each cross-correlation found using said inner product sequence error calculation section and a corresponding fingertip orientation;

an orientation detection section that outputs a fingertip orientation corresponding to a cross-correlation having a maximum value among those registered in said sequence error temporary storage section; and a control section that controls timing of each operation of said inner product sequence calculation section, inner product sequence error calculation section, and orientation detection section.

9. A fingerprint fingertip orientation detection method comprising the steps of:

finding ridge directions at prescribed positions around a circumference of an inputted fingerprint;

computing respective dot products of the ridge directions at the prescribed positions and a plurality of radial lines extending from a prescribed center point of the inputted fingerprint that intersect the respective prescribed positions;

obtaining a dot product sequence for a complete revolution with respect to the prescribed center point based on the respective dot products computed in the computing step; and comparing the obtained dot product sequence with a plurality of stored dot product sequences of a standard fingerprint at different orientations, wherein a particular one of the different orientations that corresponds to one of the stored dot product sequences that most closely matches the obtained dot product sequence is determined as the fingerprint orientation of the inputted fingerprint.

10. A fingerprint fingertip orientation detection method according to claim 9, wherein the plurality of radial lines respectively extend from a starting point a first fixed radial distance away from the prescribed center point to an ending point a second fixed radial distanced away from the prescribed center point.

* * * * *